US006226611B1

(12) United States Patent
Neumeyer et al.

(10) Patent No.: US 6,226,611 B1
(45) Date of Patent: May 1, 2001

(54) METHOD AND SYSTEM FOR AUTOMATIC TEXT-INDEPENDENT GRADING OF PRONUNCIATION FOR LANGUAGE INSTRUCTION

(75) Inventors: Leonardo Neumeyer, Palo Alto; Horacio Franco, Atherton; Mitchel Weintraub, Fremont; Patti Price, Menlo Park, all of CA (US); Vassilios Digalakis, Chania (GR)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 09/491,374

(22) Filed: Jan. 26, 2000

Related U.S. Application Data

(63) Continuation of application No. 08/942,780, filed on Oct. 2, 1997, now Pat. No. 6,055,498, which is a continuation of application No. 08/935,414, filed on Sep. 23, 1997, now abandoned.
(60) Provisional application No. 60/027,638, filed on Oct. 2, 1996.

(51) Int. Cl.[7] .................................................. G10L 15/08
(52) U.S. Cl. ........................ 704/246; 704/240; 434/185
(58) Field of Search ................................. 704/246, 249, 704/254, 276, 200; 434/185

(56) References Cited

U.S. PATENT DOCUMENTS

| 4,276,445 | 6/1981 | Harbeson ................................. 179/1 |
| 4,380,438 | 4/1983 | Okamoto ............................... 434/157 |
| 4,481,593 | 11/1984 | Bahler ................................ 364/513.5 |
| 4,489,434 | 12/1984 | Moshier .................................. 381/43 |
| 4,641,343 | 2/1987 | Holland et al. ......................... 381/48 |
| 4,752,958 | 6/1988 | Cavazza et al. ......................... 381/42 |
| 4,761,815 | 8/1988 | Hitchcock ............................... 381/43 |
| 4,783,803 | 11/1988 | Baker et al. ............................ 381/42 |
| 4,852,180 | 7/1989 | Levinson ................................ 381/43 |
| 4,860,360 | 8/1989 | Boggs ................................... 381/48 |

(List continued on next page.)

FOREIGN PATENT DOCUMENTS

WO 94/10666 * 11/1993 (WO) .............................. G09B/19/04

OTHER PUBLICATIONS

Rypa, Marikka Elizabeth. "Vilts: The Voice Interactive Language Training System." SRI International, Menlo Park, CA. Calico 1996.
Neumeyer, Leonardo et al. "Automatic Text–Independent Pronunciation Scoring of Foreign Language Student Speech." SRI International, Menlo Park, CA. ICSLP 1996.
Digalakis, Vassilios et al. "Genones: Generalized Mixture Tying in Continuous Hidden Markov Model–Based Speech Recognizers." SRI International, Menlo Park, CA. IEEE Trans. Speech & Audio Processing Journal, Jun. 1994.

(List continued on next page.)

Primary Examiner—David Hudspeth
Assistant Examiner—Donald L. Storm
(74) Attorney, Agent, or Firm—Townsend and Townsend and Crew LLP; Kenneth R. Allen

(57) ABSTRACT

Pronunciation quality is automatically evaluated for an utterance of speech based on one or more pronunciation scores. One type of pronunciation score is based on duration of acoustic units. Examples of acoustic units include phones and syllables. Another type of pronunciation score is based on a posterior probability that a piece of input speech corresponds to a certain model such as an HMM, given the piece of input speech. Speech may be segmented into phones and syllables for evaluation with respect to the models. The utterance of speech may be an arbitrary utterance made up of a sequence of words which had not been encountered before. Pronunciation scores are converted into grades as would be assigned by human graders. Pronunciation quality may be evaluated in a client-server language instruction environment.

11 Claims, 8 Drawing Sheets

U.S. PATENT DOCUMENTS

| | | | |
|---|---|---|---|
| 4,887,212 | 12/1989 | Zamora et al. | 364/419 |
| 4,969,194 | 11/1990 | Ezawa et al. | 381/48 |
| 5,010,495 | 4/1991 | Willetts | 364/513.5 |
| 5,027,406 | 6/1991 | Roberts et al. | 381/43 |
| 5,075,896 | 12/1991 | Wilcox et al. | 382/39 |
| 5,148,489 | 9/1992 | Erell et al. | 381/47 |
| 5,199,077 | 3/1993 | Wilcox et al. | 381/43 |
| 5,268,990 | 12/1993 | Cohen et al. | 395/2 |
| 5,274,739 | 12/1993 | Woodard | 395/2 |
| 5,307,444 | 4/1994 | Tsuboka | 395/22 |
| 5,329,608 | 7/1994 | Bocchieri et al. | 395/2.52 |
| 5,329,609 | 7/1994 | Sanada et al. | 395/2.6 |
| 5,333,275 | 7/1994 | Wheatley et al. | 395/2.52 |
| 5,475,792 | 12/1995 | Stanford et al. | 395/2.42 |
| 5,487,671 | 1/1996 | Shpiro et al. | 434/185 |
| 5,503,560 | 4/1996 | Steniford | 434/167 |
| 5,509,104 | 4/1996 | Lee et al. | 395/2.65 |
| 5,581,655 | 12/1996 | Cohen et al. | 395/2.54 |
| 5,615,296 * | 3/1997 | Stanford et al. | 704/201 |
| 5,634,086 | 5/1997 | Rtischev et al. | 395/2.79 |
| 5,638,487 | 6/1997 | Chigier | 395/2.62 |
| 5,673,362 | 9/1997 | Matsumoto | 395/2.69 |
| 5,679,001 * | 10/1997 | Russell et al. | 434/185 |
| 5,722,418 * | 3/1998 | Bro | 128/732 |
| 5,825,978 * | 10/1998 | Digalakis et al. | 704/256 |
| 6,055,498 * | 4/2000 | Neumeyer et al. | 704/246 |
| 8,862,408 | 8/1989 | Zamora | 364/900 |

OTHER PUBLICATIONS

Digalakis, Vassilios et al. "Genones: Optimizing the Degree of Mixture Tying in a Large Vocabulary Hidden Markov Model Based Speech Recognizer." SRI International, Menlo Park, CA. ICASSP 1994.

Bernstein, Jared et al. "Automatic Evaluation and Training in English Pronunciation." SRI International, Menlo Park, CA. Nov. 22, 1990.

Rabiner, L.R. et al. "An Introduction to Hidden Markov Models." IEEE ASSP Magazine, Jan. 1986.

Rose, Richard C. et al. "A Hidden Markov Model Based Keywork Recognition System." Lincoln Laboratory, MIT. Proceedings of ICASSP 1990.

Rtischev, Dimitry et al. "Toward Commercial Applications of Speaker–Independent Continuous Speech Recognition." SRI International, Menlo Park, CA. Apr. 23, 1991.

Bernstein, Jared et al. "A Voice Interactive Language Instruction System." SRI International, Menlo Park, CA. Sep. 25, 1991.

Bagshaw, Paul Christopher. "Automatic Prosodic Analysis for Computer Aided Pronunciation Teaching." Thesis for Doctor of Philosophy. University of Edinburgh, 1994.

Lines, B.M. "A Model for Assessing the Ability of an Office Local Area Network, Employing the Technical Office Protocol (TOP) to Carry Interactive Speech While Heavily Loaded with Data Traffic." International Conference on Private Switching Systems and Networks, pp. 190–194, Jun. 21–23, 1988.

Kim, Kiseok et al. "A Study on the Recognition of the Korean Monothongs Using Artificial Neural Net Models." Proceedings of the 5th Jerusalem Conference on Information Technology, pp. 364–371, Oct. 22–25, 1990.

Wilcox, Lynn D. et al. "Training and Search Algorithms for an Interactive Wordspotting System." ICASSP–92, pp. 97–100 vol. 2, Mar. 23–26, 1992.

Feb. 3, 1999 Office Action received in Application No. 08/935,414.

* cited by examiner

METHOD AND SYSTEM FOR AUTOMATIC TEXT-INDEPENDENT GRADING OF PRONUNCIATION FOR LANGUAGE INSTRUCTION

CROSS-REFERENCES TO RELATED APPLICATIONS

This application is a continuation of application Ser. No. 08/942,780 filed Oct. 2, 1997 now U.S. Pat. No. 6,055,498 issued Apr. 25, 2000, which was a continuation of application Ser. No. 08/935,414 filed Sep. 23, 1997, abandoned, which claims benefit under 35 USC 119 of Provisional Application No. 60/027,638 filed Oct. 2, 1996. The content of the provisional application is incorporated herein by reference.

STATEMENT OF SPONSORSHIP

This invention was made in whole or in part with the use of Government funds from the Central Intelligence Agency under Contract 94-F130400-00. The government has certain rights in the invention.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to automatic evaluation of speech pronunciation quality. One application is in computer-aided language instruction and assessment.

Techniques related to embodiments of the present invention are discussed in co-assigned U.S. Pat. No. 5,864,810, entitled METHOD AND APPARATUS FOR SPEECH RECOGNITION ADAPTED TO AN INDIVIDUAL SPEAKER; U.S. Pat. No. 5,825,978, entitled METHOD AND APPARATUS FOR SPEECH RECOGNITION USING OPTIMIZED PARTIAL MIXTURE TYING OF HMM STATE FUNCTIONS; U.S. Pat. No. 5,634,086, entitled METHOD AND APPARATUS FOR VOICE-INTERACTIVE LANGUAGE INSTRUCTION; and U.S. Pat. No. 5,581,655, entitled METHOD FOR RECOGNIZING SPEECH USING LINGUISTICALLY-MOTIVATED HIDDEN MARKOV MODELS Relevant speech recognition techniques using Hidden Markov Models are also described in V. Digalakis and H. Murveit, "GENONES: Generalized Mixture-Tying in Continuous Hidden-Markov-Model-Based Speech Recognizers," IEEE Transactions on Speech and Audio Processing, Vol. 4, July, 1996, which is incorporated herein by reference.

Computer-aided language instruction systems exist that exercise the listening and reading comprehension skills of language students. While such systems have utility, it would be desirable to add capabilities to computer-based language instruction systems that allow students' language production skills also to be exercised. In particular, it would be desirable for a computer-based language instruction system to be able to evaluate the quality of the students' pronunciation.

A prior-art approach to automatic pronunciation evaluation is discussed in previous work owned by the assignee of the present invention. See Bernstein et al., "Automatic Evaluation and Training in English Pronunciation", Internat. Conf. on Spoken Language Processing, 1990, Kobe, Japan. This prior-art approach is limited to evaluating speech utterances from students who are reading a pre-selected set of scripts for which training data had been collected from native speakers. This prior-art approach is referred to as text-dependent evaluation because it relies on statistics related to specific words, phrases, or sentences.

The above-referenced prior-art approach is severely limited in usefulness because it does not permit evaluation of utterances which were not specifically included in the training data used to train the evaluation system, so that retraining of the evaluation system is required whenever a new script needs to be added for which pronunciation evaluation is desired.

What is needed are methods and systems for automatic assessment of pronunciation quality capable of grading even arbitrary utterances—i.e., utterances made up of word sequences for which there may be no training data or incomplete training data. This type of needed pronunciation grading is termed text-independent grading.

The prior-art approach is further limited in that it can generate only certain types of evaluation scores, such as a spectral likelihood score. While the prior-art approach achieves a rudimentary level of performance using its evaluation scores, the level of performance is rather limited, as compared to that achieved by human listeners. Therefore, what is also needed are methods and systems for automatic assessment of pronunciation quality that include more powerful evaluation scores capable of producing improved performance.

GLOSSARY

In this art, the same terms are often used in different contexts with very different meanings. For purposes of clarity, in this specification, the following definitions will apply unless the context demands otherwise:

Grade: An assessment of the pronunciation quality of a speaker or a speech utterance on a grade scale such as used by human expert listeners. A grade may be human- or machine-generated.

Score: A value generated by a machine according to a scoring function or algorithm as applied to a speech utterance.

A Frame of Acoustic Features: A characterization of speech sounds within a short time-frame produced by a feature extractor for subsequent processing and analysis. For example, a feature extractor that computes acoustic features every 10 ms within a shifting 20 ms window is said to produce a "frame of acoustic features" every 10 ms. In general, a frame of acoustic features is a vector.

Acoustic Segments: Time-segments of speech whose boundaries (or durations) are determined by a speech segmenter based on acoustic properties of the speech. In an embodiment of the invention, each acoustic segment produced by the speech segmenter is a "phone."

Phone: A basic speech sound unit within a given language. In general, all speech utterances for a given language may be represented by phones from a set of distinct phone types for the language, the number of distinct phone types being on the order of 40.

Acoustic Units: Time-segments of speech whose durations are used to generate a score that is indicative of pronunciation quality. In an embodiment of the invention, acoustic units are simply the acoustic segments produced by the speech segmenter. In another embodiment, acoustic units are "syllables" whose durations are determined based on the boundaries (or durations) of the acoustic segments produced by the speech segmenter.

SUMMARY OF THE INVENTION

According to the invention, methods and systems are provided for assessing pronunciation quality of an arbitrary speech utterance based on one or more metrics on the utterance, including acoustic unit duration and a posterior-probability-based evaluation.

A specific embodiment of the invention is a method for assessing pronunciation of a student speech sample using a computerized acoustic segmentation system, wherein the method includes: accepting the student speech sample which includes a sequence of words spoken by a student speaker; operating the computerized acoustic segmentation system to define acoustic units within the student speech sample based on speech acoustic models within the segmentation system, the speech acoustic models being established using training speech data from at least one speaker, the training speech data not necessarily including the sequence of spoken words; measuring duration of the sample acoustic units; and comparing the sample acoustic unit durations to a model of exemplary acoustic unit duration to compute a duration score indicative of similarity between the sample acoustic unit durations and exemplary acoustic unit durations.

According to a further specific embodiment, the duration score is further mapped to a grade, and the grade is presented to the student speaker.

According to a further specific embodiment, the spoken sequence of words is unknown, and a computerized speech recognition system is operated to determine the spoken sequence of words.

A further specific embodiment of the invention is a method for grading the pronunciation of a student speech sample, the method including: accepting the student speech sample which includes a sequence of words spoken by a student speaker; operating a set of trained speech models to compute at least one posterior probability from the speech sample, each of the posterior probabilities being a probability that a particular portion of the student speech sample corresponds to a particular known model given the particular portion of the speech sample; and computing an evaluation score, herein referred to as the posterior-based evaluation score, for the student sample of pronunciation quality from the posterior probabilities.

According to a further specific embodiment, the posterior-based score is further mapped to a grade as would be assigned by human grader, and the grade is presented to the student speaker.

A still further specific embodiment of the invention is a system for assessing pronunciation of a student speech sample, the student speech sample including a sequence of words spoken by a student speaker, the system including: trained speech acoustic models of exemplary speech; and an acoustic scorer configured to compute at least one posterior probability from the speech sample using the trained speech models, the acoustic scorer also configured to compute an evaluation score of pronunciation quality for the student sample from the posterior probabilities, each of the posterior probabilities being a probability that a particular portion of the student speech sample corresponds to a particular known model given the particular portion of the speech sample.

A still further specific embodiment of the invention is a system for pronunciation training in a client/server environment wherein there exists a client process for presenting prompts to a student and for accepting student speech elicited by the prompts, the system including: a server process for sending control information to the client process to specify a prompt to be presented to the student and for receiving a speech sample derived from the student speech elicited by the presented prompt; and a pronunciation evaluator invocable by the server process for analyzing the student speech sample.

A further understanding of the nature and advantages of the present invention may be realized by reference to the remaining portions of the specification and the drawings.

DESCRIPTION OF THE SPECIFIC EMBODIMENTS

I. AUTOMATIC PRONUNCIATION EVALUATION

Figure 1:
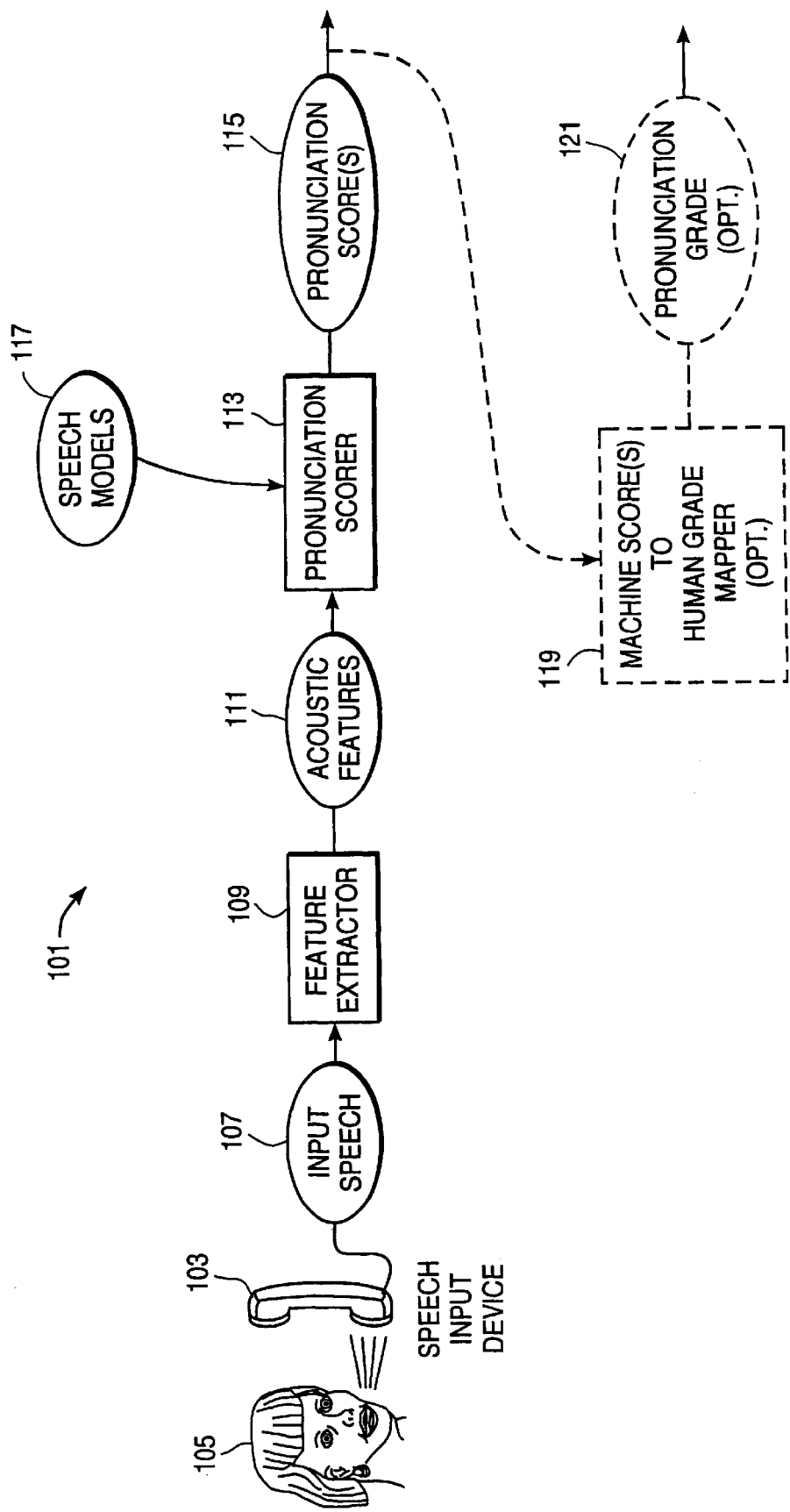
FIG. 1 is a block diagram of a system for evaluating pronunciation quality.

FIG. 1 is a block diagram of a system 101 for evaluating pronunciation quality according to embodiments of the present invention. In FIG. 1, a speech input device 103 converts a sequence of spoken words from a speaker 105 into machine-readable input speech 107. A feature extractor 109 divides the input speech 107 into time-frames and computes, for each time-frame, acoustic features that capture distinguishing characteristics of speech sounds within the time-frame. In this manner, the feature extractor 109 produces a sequence of acoustic feature frames 111. The input speech 107 and the sequence of acoustic feature frames 111 are both representations of the speaker 105's speech and may therefore each be referred to as a "student speech sample."

A pronunciation scorer 113 computes from the acoustic features 111 at least one pronunciation score 115 that is indicative of pronunciation quality of the input speech 107. In computing the pronunciation scores 115, the pronunciation scorer 113 relies upon speech models 117 which characterize various aspects of desirable, i.e. exemplary, speech pronunciation. The speech models 117 are established using training speech from exemplary speakers.

In some embodiments of the present invention, an optional score-to-grade mapper 119 accepts the pronunciation scores 115 and maps them into a pronunciation grade 121 as would be given by an expert human grader.

During operation of the pronunciation evaluation system 101, the various data, including the input speech 107, the acoustic features 111, the pronunciation score(s) 115, and the pronunciation grade 121 may be stored in storage devices for later use.

In embodiments of the present invention, the acoustic features 111 include features used in the speech recognition task, which are known in the art and are discussed for example in the references cited and referenced in the Background section. For example, in an embodiment of the present invention, the acoustic features 111 include 12th order mel-cepstra features computed every 10 ms within a shifting 20 ms window, and the features' approximate derivatives.

In an embodiment of the present invention, the speech input device 103 is a telephone, and the speech input 107 is conveyed across a telephone network to the feature extractor 109. This embodiment enables students to have their spoken pronunciation evaluated by the present invention so long as they have access to a telephone.

In an embodiment of the present invention, the speech input device 103 is a digitizing microphone system, such as a microphone connected to a remote, "client" computing system that contains hardware and software for audio digitization. The input speech 107 is conveyed in digitized form (e.g., as streaming audio or as a compressed audio file) across a digital network, for example, a local area network and/or the Internet, to the feature extractor 109 which exists on a local, "server" computing system. This embodiment enables students to have their spoken pronunciation evaluated by the present invention so long as they have access to a digitizing microphone system connected to the digital network.

In an embodiment of the present invention, the speech input device 103 and the feature extractor 109 reside on at least one remote computing system and the acoustic features 111 are conveyed across a network, for example, the Internet, to the pronunciation scorer 113 which exists on a local computing system. This embodiment reduces the amount of data which need be conveyed across the network because acoustic features 111 typically are a more compact representation of speech than are the input speech 107 itself in this embodiment. This embodiment also reduces the amount of computation required of the local computing system.

II. SCORING PRONUNCIATION USING ACOUSTIC UNIT DURATIONS

Figure 2:
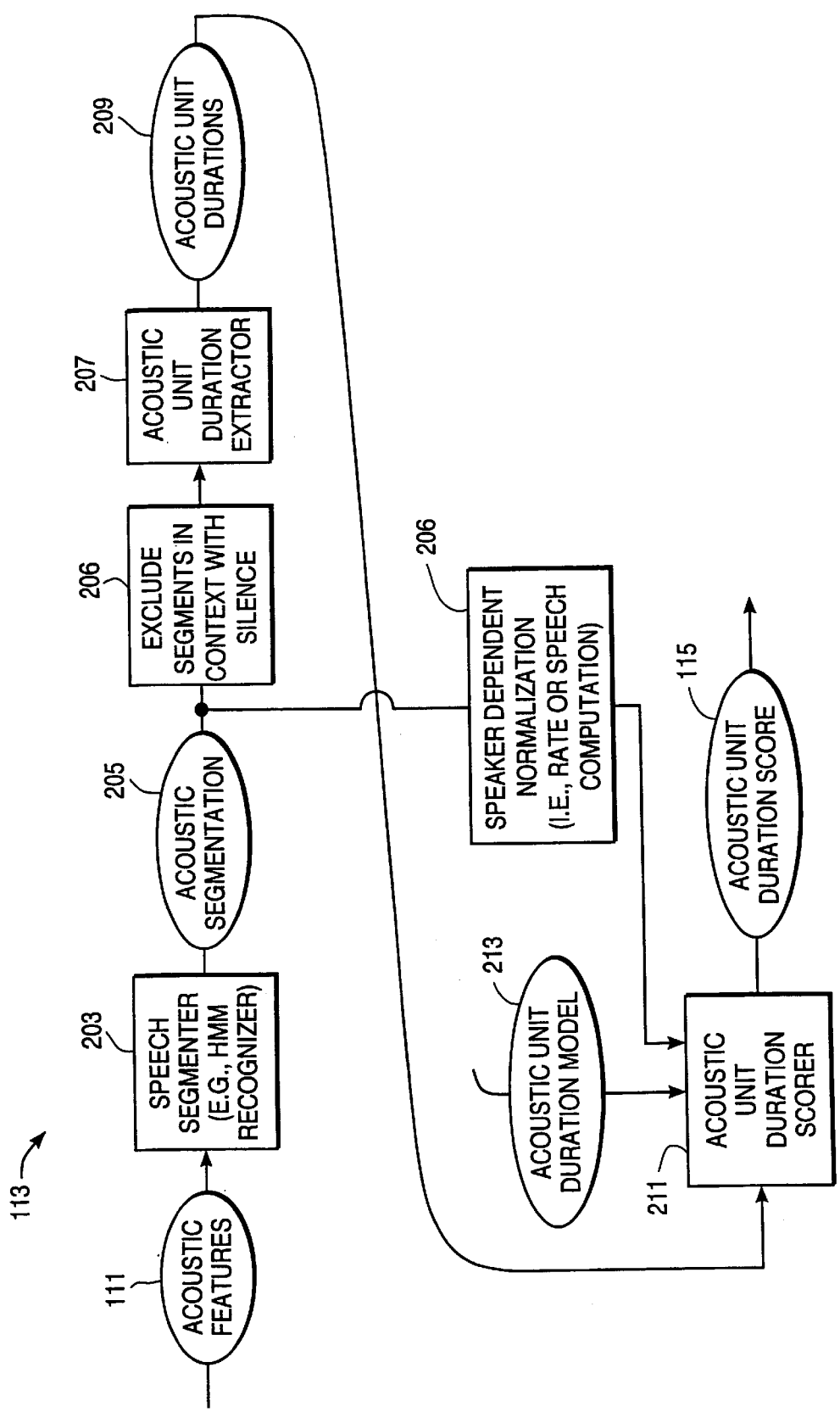
FIG. 2 is a block diagram of a pronunciation scorer of FIG. 1 that produces a pronunciation score based on duration of acoustic units according to an embodiment of the present invention.

FIG. 2 is a block diagram of a pronunciation scorer 113 of FIG. 1 according to embodiments of the present invention that produce a pronunciation score 115 based on duration of acoustic units. In FIG. 2, a speech segmenter 203 accepts the sequence of acoustic features 111 and produces from them a time-segmentation 205 specifying acoustic segments. The acoustic segmentation 205 is a representation of acoustic segments from which their durations may be determined. In an embodiment, the acoustic segmentation 205 comprises a time-boundary of each acoustic segment plus each acoustic segment's duration. (Note that in general segment boundaries define durations, and a sequence of durations defines segment boundaries given a single boundary within the sequence. Therefore, a system component that is described as using boundaries can in general be alternatively but equivalent described as using durations, or durations plus a boundary.)

An acoustic unit duration extractor 207 accepts the acoustic segmentation 205. From the acoustic segmentation 205, the acoustic unit duration extractor 207 recovers or computes durations 209 of the acoustic units.

An acoustic unit duration scorer 211 accepts the acoustic unit durations 209 and compares them to a model 213 of exemplary acoustic unit duration which has been established using training speech from exemplary speakers. Based on this comparison, the acoustic unit duration scorer 211 computes an acoustic unit duration score 115 as the pronunciation score 115 of FIG. 1. The acoustic unit duration model 213 forms a part of the speech models 117 of FIG. 1. In embodiments of the invention, the acoustic unit duration model 213 may be a parametric model or a non-parametric model. In another embodiment of the invention, the acoustic unit duration model 213 simply contains example acoustic unit durations from exemplary speech.

It has been found that acoustic unit duration scores are particularly important indicators of pronunciation quality when the student speaker 105's speech is received through a channel that adds a large amount of noise or distortion, such as speech transmitted through a telephone connection.

In an embodiment of the present invention, the speech input device 103 (of FIG. 1), the feature extractor 109 (of FIG. 1), and the speech segmenter 203 all reside on one or more remote computing system(s) and only the acoustic segmentation 205 or only the acoustic unit durations 209 are conveyed across a network, for example, the Internet, to the acoustic unit duration scorer 211, which resides on a local computing machine. This embodiment drastically reduces the amount of data which need to be conveyed across the network and the amount of computation required of the local computing system, at the expense of requiring the remote computing system to perform more computations.

In embodiments of the present invention, the speech segmenter 203 segments the acoustic features 111 into acoustic segments which are phones. The speech segmenter 203 also identifies the type of each phone. The acoustic segmentation 205 includes segment information in the form of, for example, phone boundaries expressed as indices into the sequence of acoustic features 111 and phone type labels for each phone.

II.A. PHONE DURATION

Certain embodiments of the present invention compute duration scores 115 based on phone duration. The speech segmenter 203 segments the acoustic features 111 into acoustic segments which are phones. The acoustic unit duration extractor 207 defines acoustic units as, simply, the phones themselves. Therefore, the acoustic unit duration extractor 207 in these embodiments very simply extract the phone durations as the acoustic unit durations 209. In particular, in embodiments whose phone segmentation 205 expressly include phone durations, the acoustic unit duration extractor 207 simply uses the existing phone durations as the acoustic unit durations 209. In embodiments whose phone segmentation 205 represents phone segmentation with only phone boundaries, the acoustic unit duration extractor 207 is an arithmetic subtractor that computes acoustic unit durations from the phone boundaries.

In certain phone-duration-scoring embodiments of the invention, the acoustic unit duration model 213 includes a separate probability distribution Pd(d|q) of phone duration d in exemplary speech given the phone's type q. For example, a system configured to use, e.g., 45 types of phones that describe a given language would have 45 probability distributions, one for each phone type.

In a specific embodiment, each phone type's duration probability distribution is represented as a parametric distribution, such as a Gaussian distribution. The parameters of these distributions are estimated according to standard statistical estimation methods using the durations of each type of phone as found in training speech from exemplary speakers.

In other, preferred embodiments, each phone type's duration probability distribution is represented as a (nonparametric) probability mass function. These probability distributions are established by tabulating durations of each type of phone as found in training speech from exemplary speakers. Each probability mass function is smoothed, and a probability floor is introduced, in order to maintain robustness of the model, given that only finite quantities of training speech are available. Phone durations of the training speech are determined during training in the same manner as are phone durations 209 of input speech 107 determined during testing. Namely, the feature extractor 109, speech segmenter 203, and acoustic unit duration extractor 207 are used.

The acoustic unit duration scorer 211 in certain phone-duration-scoring embodiments computes a log-probability $\rho_i$ of the duration $d_i$ of each phone i:

$$\rho_i = \log P_d(d_i|q_i) \quad (1)$$

wherein qi is the phone type of phone i.

The acoustic unit duration scorer 211 computes an acoustic unit duration score 115 $\rho$ for an entire utterance as the average of the log-probability $\rho_i$ of each phone i's duration:

$$\rho = \frac{1}{N} \sum_{i=1}^{N} \rho_i \quad (2)$$

wherein the sum runs over a number N of phones in the utterance.

In a preferred embodiment, the acoustic unit duration model 213 includes probability distributions Pd'(d'|q) of phone durations d' that are speaker-normalized phone durations derived from acoustic segmentation 205 by speaker dependent normalization 206. Accordingly, the acoustic unit duration scorer 211 computes the acoustic unit duration score 115 for an entire utterance as the average of the log-probability of each phone i's speaker-normalized duration d'i.

A speaker-normalized phone duration is the phone duration multiplied by the rate of speech (computed in element 206) for the speaker in question. Rate of speech (ROS) is the number of phones uttered by a speaker per second of speaking. The rate of speech of each exemplary speaker is calculated from the training speech. The rate of speech of the student speaker 105 is calculated from available data for the speaker, including the acoustic segmentation 205 itself.

The following equations summarize use of speaker-normalized phone durations in the preferred embodiment:

$$d_i' = d_i ROS \quad (3)$$

$$\rho_i = \log P_{d'}(d_i'|q_i) \quad (4)$$

$$\rho = \frac{1}{N} \sum_{i=1}^{N} \rho_i \quad (2)$$

II.B. SYLLABIC DURATION

Certain embodiments of the present invention compute duration scores 115 based on the duration of "syllables". One explanation of why syllabic duration is a good indicator of pronunciation quality, even after normalization for rate of speech (as will be described), is that language learners tend to impose the rhythm of their native language on the language they are learning. For example, English tends to be stress-timed (stressed syllables tend to be lengthened and others shortened), while Spanish and French tend to be syllable-timed.

In these syllabic-duration-scoring embodiments, the acoustic unit duration extractor 207 determines durations of acoustic units that are "syllables" based on the durations of phones as specified by the speech segmenter 203. In particular, the acoustic unit duration extractor 207 determines syllabic durations as the duration between the centers of vowel phones within speech.

In a specific syllabic-duration-scoring embodiment, the acoustic unit duration model 213 includes a single probability distribution Psd(sd) of the syllabic duration sd of any syllable. This probability distribution is established by tabulating durations of all syllables found in training speech from exemplary speakers. Syllable durations of the training speech are determined during training in the same manner as are syllable durations 209 of input speech 107 determined during testing. Namely, the feature extractor 109, speech segmenter 203, and acoustic unit duration extractor 207 are used. The duration probability distribution is represented as a probability mass function. The probability mass function is smoothed, and a probability floor is introduced, in order to maintain robustness of the model, given that only finite quantities of training speech are available.

In a preferred embodiment, the syllabic duration sdj for each syllable j is normalized during testing and training by multiplication with the speaker's rate of speech (ROS), as defined above, to obtain a speaker-normalized syllabic duration sd'j. The following equations summarize use of speaker-normalized syllabic durations in the preferred syllabic-duration-scoring embodiment:

$$sd_j' = sd_j ROS \quad (6)$$

$$\rho_j = \log P_{sd'}(sd_j') \quad (7)$$

$$\rho = \frac{1}{M} \sum_{j=1}^{M} \rho_j. \quad (8)$$

II.C. SYLLABIC DURATION USING SPECIFIC SYLLABLES

In other embodiments of the present invention, syllabic duration of specific syllables are used for scoring in a manner analogous to that described above for all syllables. In these embodiments, the acoustic unit duration extractor 207 recovers syllabic durations from the acoustic segmentation 205. The duration scorer compares these durations to a model 213 of syllabic duration in exemplary speech to compute a syllabic duration score 115.

The syllabic duration model 213 includes a probability distribution of duration for a subset of the syllables in the language. These syllables are the ones for which sufficient training speech data existed from which duration distributions could be estimated. The duration scorer compares syllables from the student speech sample with the syllable duration model 213 to derive syllabic duration pronunciation scores, based on those syllables of the student speech sample whose durations are modelled within the syllabic duration model 213.

II.D. WORD DURATION

In other embodiments of the present invention, word duration is used for scoring in a manner analogous to that described above for syllables. In these embodiments, the acoustic unit duration extractor 207 recovers word durations from the acoustic segmentation 205. The duration scorer compares these durations to a model 213 of word duration in exemplary speech to compute a word duration score 115.

The word duration model 213 includes a probability distribution of duration for a subset of the words in the language. These words are the ones for which sufficient training speech data existed from which duration distributions could be estimated. The duration scorer compares words from the student speech sample with the word duration model 213 to derive word duration pronunciation scores, based on those words of the student speech sample whose durations are modelled within the word duration model 213.

III. AN HMM SPEECH RECOGNIZER FOR ACOUSTIC SEGMENTATION

Figure 3:
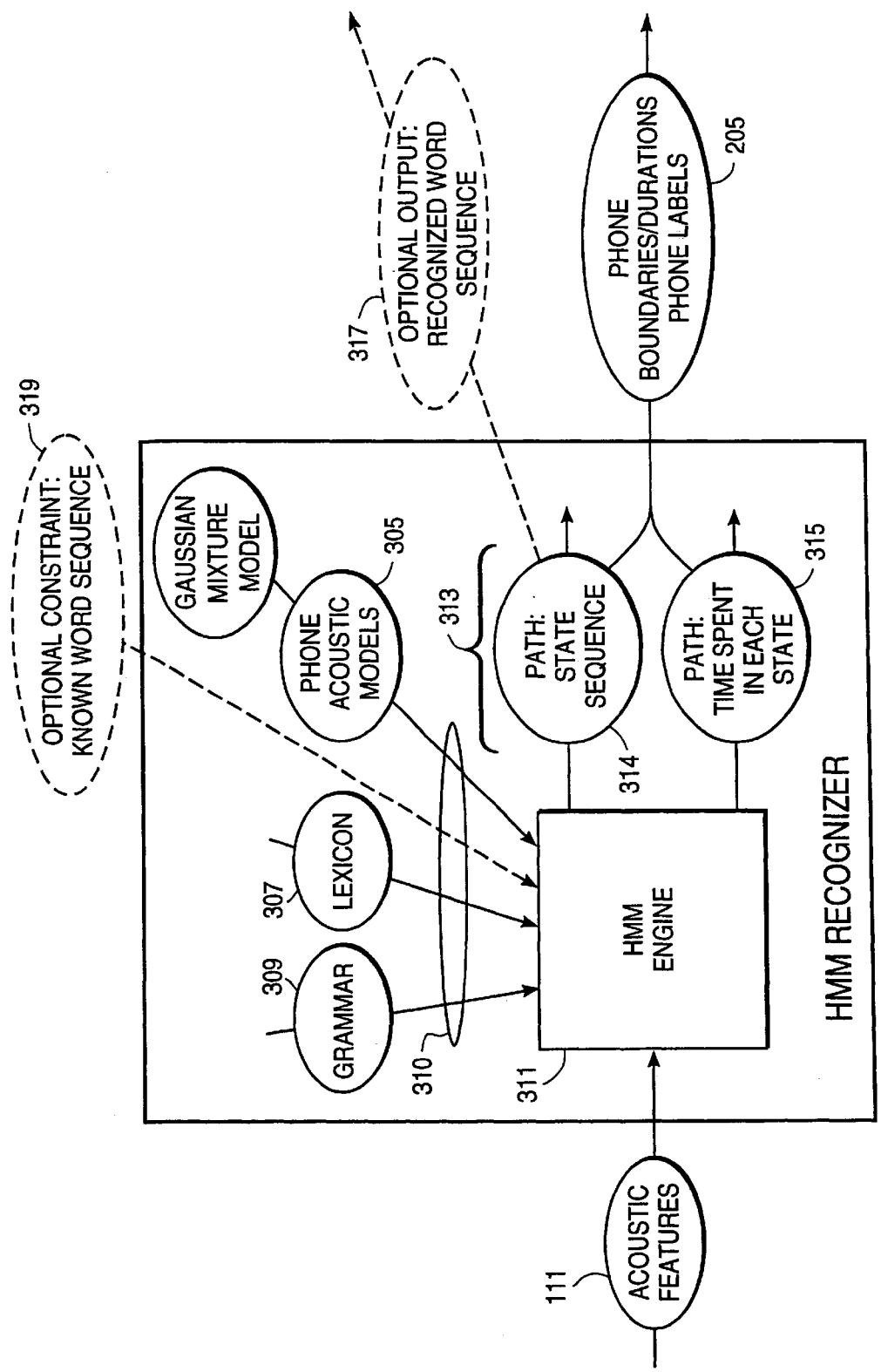
FIG. 3 is a block diagram showing a speech segmenter of FIG. 2 that is a hidden Markov model (HMM) speech recognizer according to an embodiment of the present invention.

FIG. 3 is a block diagram showing a speech segmenter 203 of FIG. 2 that is an HMM speech recognizer 203, according to a specific embodiment of the present invention. HMM speech recognizers are known in the art and are discussed for example in the references cited and incorporated in the Background section.

A Markov model (MM) is a network of states connected by directed transition branches. The HMM speech recognizer 203 uses a Markov model to model the production of speech sounds. The HMM recognizer 203 represents each type of phone in a language by a phone model made up of a handful of connected states. (The specific embodiment uses 3 states per phone model for most phone types.) The HMM recognizer 203 also provides additional, context-dependent phone models, including "tri-phone" models, that represent each phone type when it is preceded and/or followed by particular other phone types. The HMM recognizer 203 also includes a pause phone which models pauses that occur during speech between words. The phone models, including the context-dependent and pause phone models, form acoustic models 305 within the HMM recognizer 203.

Each state in a speech HMM has an associated probability distribution of the acoustic features which are produced while in the state. (These output distributions are alternatively but equivalently described in the literature as being associated with the transition branches.) The output distributions may be Gaussian distributions, or weighted mixtures of Gaussian distributions, etc., as are described in the literature. The HMM recognizer 203 of the specific embodiment uses output distributions which are weighted tied mixtures of Gaussian distributions. Weighted tied mixtures are known in the art of speech recognition. A standard HMM speech recognizer which can be configured to implement the HMM recognizer 203 of the specific embodiment is the DECIPHER system from SRI International of Menlo Park, Calif.

Each transition branch in a Markov model has a transition probability indicating the probability of transiting from the branch's source state to its destination state. All transition probabilities out of any given state, including any self transition probabilities, sum to one.

The output and transition probability distributions for all states in a speech HMM are established from training speech data using standard HMM training algorithms and techniques, including the forward-backward (Baum-Welch) algorithm. A standard HMM-based speech recognizer on which such training can be performed is the DECIPHER system from SRI International of Menlo Park, Calif.

According to the present invention, the training speech are not required to include the sequence of spoken words found in the input speech 107. These training speech are not even required to include individual words from the sequence of spoken words found in the input speech 107.

A lexicon 307 is a catalog of words in a language and defines component phone types that make up each word. In some embodiments of the invention, the lexicon 307 also includes any assigned transition probabilities from phone type to phone type within each word. A grammar 309 describes allowed word-to-word transitions in a language. The grammar 309 of the specific embodiment is a "bi-gram" that specifies context-free word-to-word transition probabilities between every pair of words. The grammar 309 also allows an optional pause phone between words to model possible pauses between words during speech. The grammar 309 allows the pause phone to be skipped. The grammar 309 implements a skip as a transition arc which does not correspond to any outputted acoustic features.

Grammars 309 and lexicons 307 together form a grammar network 310 that specifies allowable links between phones and, hence, allowable words and sentences. Grammars, lexicons, and grammar networks are known elements of HMM speech recognizers. The grammar network 310 and the phone acoustic models 305 form a part of the speech models 117 (of FIG. 1).

All phone models 305 plus the lexicon 307 and the grammar 309 may be considered to be a vast virtual network called "the HMMs" or "the recognition HMM." The HMM recognizer 203 models every spoken sentence as having been produced by traversing a path through the states within the HMMs. In general, a frame of acoustic features is produced at each time-step along this path. (However, some state transitions such as the "skip" transition take no time and produce no output.) The path identifies the sequence of states traversed. The path also identifies the duration of time spent in each state of the sequence, thereby defining the time-duration of each phone and each word of a sentence. Put in another way, the path describes an "alignment" of the sequence of frames 111 with a corresponding sequence of states of the HMMs.

In FIG. 3, the HMM speech recognizer 203 is operated not merely for its ordinary purpose of speech recognition, but also for time-segmenting speech into component phones. In FIG. 3, The HMM recognizer 203 accepts the acoustic features 111. The HMM recognizer 203 includes hidden Markov models (HMMs) specified by the phone acoustic models 305, the lexicon 307, and the grammar 309. An HMM search engine 311 within the HMM recognizer 203 computes a maximum likelihood path 313.

The maximum likelihood path is a path through the hidden Markov models with the maximum likelihood of generating the acoustic feature sequence 111 extracted from the speech of the user. The maximum likelihood path 313 includes the sequence of states traversed 314 and the duration of time 315 spent in each state. The maximum likelihood path 313 defines an acoustic segmentation 205 of the acoustic features into a sequence of phones. The acoustic segmentation 205 of the specific embodiment is a subset of the path information 313, including time boundaries (and/or durations) and the phone-type labels of the sequence of phones. Using the duration information from the acoustic segmentation 205, the present invention evaluates pronunciation quality, as was described above in connection with FIGS. 1 and 2.

The HMM search engine 311 computes the maximum likelihood path through its speech HMMs according to a standard pruning HMM search algorithm that uses the well-known Viterbi search method. This HMM search algorithm is described for example in the cited and incorporated art and elsewhere in the literature. The Viterbi algorithm is also discussed in numerous other references, such as G. D. Forney, Jr., "The Viterbi algorithm," Proc. IEEE, vol. 61, pp. 268–278, 1973.

In the specific embodiment, the sequence of spoken words from the speaker 105 may or may not be known in advance by the pronunciation evaluation system 101. If the sequence of spoken words is not known in advance, then the HMM recognizer 203 outputs, in addition to the acoustic segmentation 205, the recognized word sequence 317 for other use. For example, the recognized word sequence 317 may be used by an interactive language instruction system included in the specific embodiment. This language instruction system might determine the meaning of the recognized word sequence 317 and whether the recognized word sequence 317 is a correct and appropriate utterance in relation to a current lesson being conducted.

If the sequence of spoken words is known in advance, then the known word sequence 319 is fed to the HMM engine 311 to dramatically constrain the possible paths through the HMMs. This known word sequence 319 represents additional information that forms a part of the grammar network 310. The sequence of spoken words may be known in advance for example because a language instruction system has requested that the speaker 105 read from a known script. Using the known word sequence 319 as an additional constraint can reduce recognition and segmentation errors and also reduce the amount of computation required by the HMM engine 311.

Figure 4:
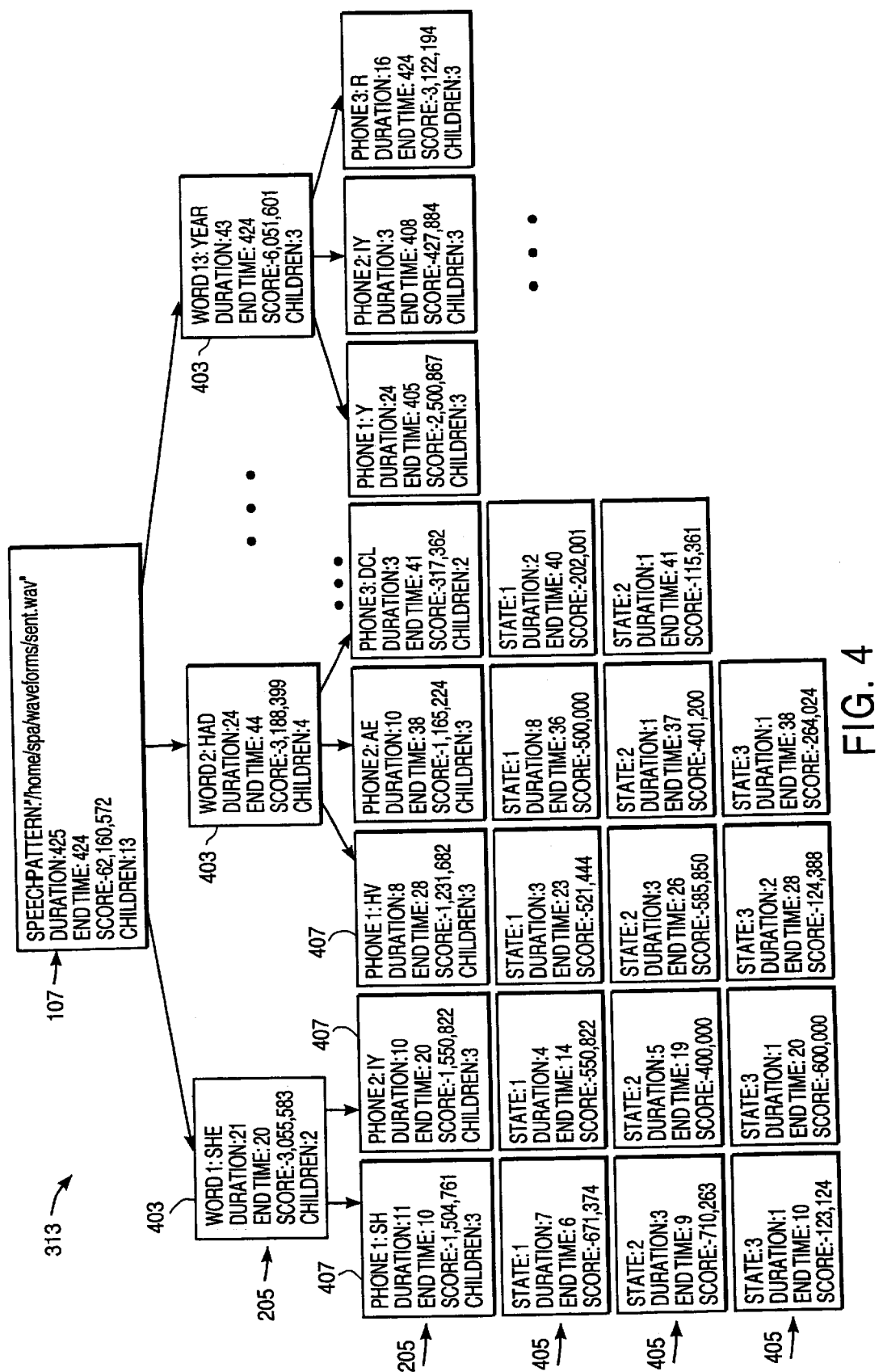
FIG. 4 is a diagram illustrating a portion of a maximum likelihood path for sample input speech.

FIG. 4 is a diagram illustrating a portion of a maximum likelihood path 313 for sample input speech 107 in accordance with the invention. The input speech 107 is composed of its constituent words 403, which are in turn broken down into constituent phones 205, which are themselves broken down into constituent states 405. The constituent phones 205 include phone type labels 407 as well as information that specifies each phone's duration.

IV. SCORING PRONUNCIATION USING ACOUSTIC FEATURES

Figure 5:
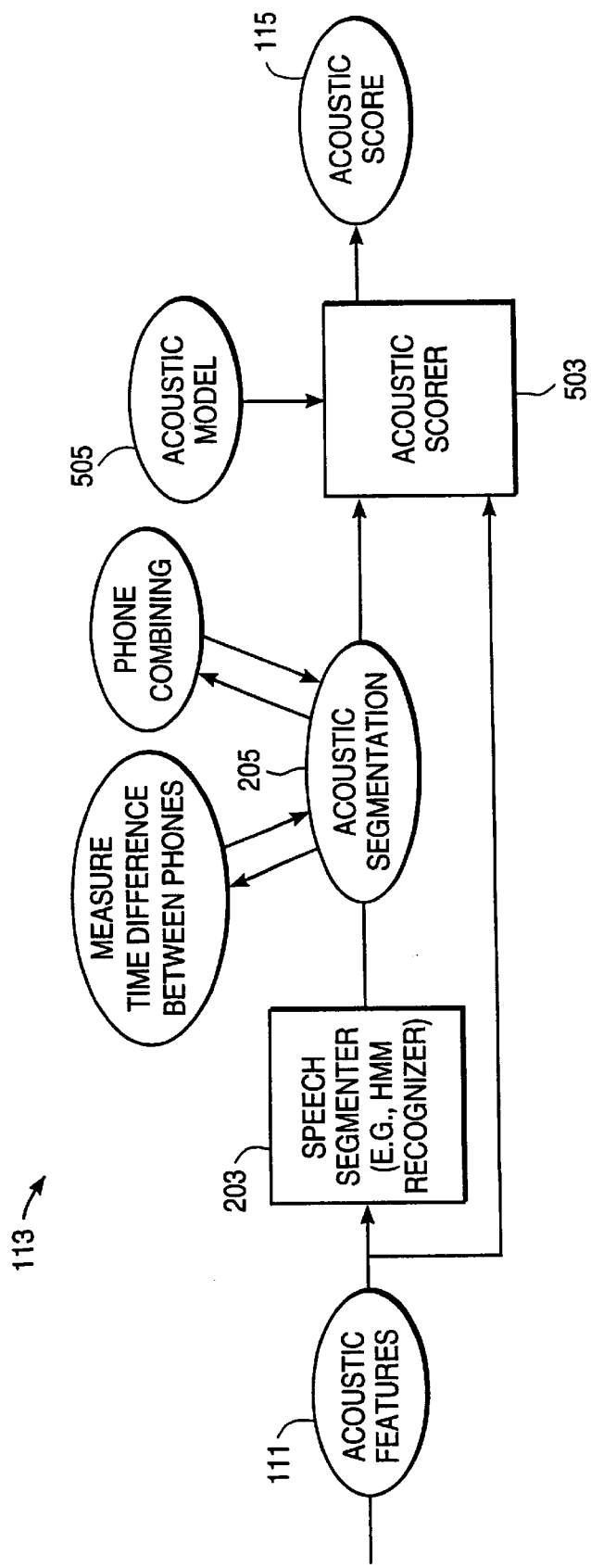
FIG. 5 is a block diagram of a system for computing an acoustic score based directly on the acoustic features 111 themselves according to embodiments of the present invention.

FIG. 5 is a block diagram of a system 113 for computing an acoustic score 115 based directly on the acoustic features 111 themselves, rather than on acoustic unit durations, according to embodiments of the present invention.

In FIG. 5, a speech segmenter 203 accepts the sequence of acoustic features 111 and produces from them a time-segmentation 205 specifying acoustic segments. An acoustic scorer 503 accepts the acoustic segmentation 205 and also the sequence of acoustic features 111. The acoustic scorer 503 uses the acoustic segmentation 205 to index into the sequence of acoustic features 111. In this way, the acoustic scorer 503 obtains acoustic feature frames which correspond to each acoustic segment.

The acoustic scorer 503 compares the acoustic feature frames of the acoustic segments to a model 505 of exemplary acoustic feature frames. The model 505 was established using training speech from exemplary speakers. Based on this comparison, the acoustic scorer 503 computes the acoustic score 115 as the pronunciation score 115 of FIG. 1. The acoustic model 505 forms a part of the speech models 117 of FIG. 1.

In certain acoustic-scoring embodiments of the invention, the speech segmenter 203 is an HMM recognizer 203 that produces an acoustic segmentation 205 of the sequence of acoustic features 111 into phones, as was described in connection with FIG. 3. The acoustic model 505 in certain of these embodiments includes separate models of acoustic feature frames for each phone type. In a preferred embodiment, these models are HMM models from the HMM recognizer 203 used for segmentation.

IV.A. PHONE LOG-POSTERIOR PROBABILITY SCORES

In a specific acoustic-scoring embodiment, each of the separate models corresponding to a phone type q is a context-independent probability density p(y|q), wherein the variable y represents an acoustic feature frame. The acoustic scorer 503 computes, for each frame yt within a phone i of phone type qi, a frame-based posterior probability P(qi|yt) of phone i's type given the observed acoustic feature frame yt:

$$P(q_i \mid y_t) = \frac{p(y_t \mid q_i)P(q_i)}{\sum_{All\ q} p(y_t \mid q)P(q)} \quad (9)$$

wherein p(yt|qi) is the probability of the frame yt according to the distribution corresponding to phone type qi. The sum over q runs over all phone types. P(qi) represents the prior probability of the phone type qi.

The acoustic scorer 503 of the specific embodiment computes a phone posterior score pi for each phone i defined by the acoustic segmentation 205. Each phone i's phone posterior score is an average of the logarithms of the frame-based posterior probabilities P(qi|yt) of all frames within phone i. Each phone i's phone posterior score ρi can be expressed as:

$$\rho_i = \frac{1}{d_i} \sum_{t=t_i}^{t_i+d_i-1} \log P(q_i \mid y_t) \quad (10)$$

wherein the sum runs over all di frames of phone i.

The acoustic scorer 503 of the specific embodiment computes the acoustic score 115 ρ for an entire utterance as the average of the phone posterior scores ρi of each phone i:

$$\rho = \frac{1}{N} \sum_{i=1}^{N} \rho_i \quad (11)$$

wherein the sum runs over the number N of phones in the utterance. This acoustic score 115 ρ is an example of an acoustic-posterior-probability-based score.

The acoustic-posterior-probability-based score 115 ρ is designed to be potentially less affected by changes in spectral match due to particular speaker characteristics or acoustic channel variations. Changes in acoustic match are likely to affect both numerator and denominator similarly in Equation (9), thereby making the acoustic score 115 more invariant to those changes and more focused on phonetic quality.

In the specific embodiment, the acoustic scorer 503 computes each of the context-independent probability densities p(y|q) shown in Equation (9) using distributions from context-independent hidden Markov phone models. In the numerator of Equation (9), p(yt|qi) is computed by evaluating the output distribution of the HMM state to which the frame yt is aligned in phone type qi's HMM. The sum over all phone types in the denominator of Equation (9) is computed using the output distribution of the most likely HMM state (for the frame yt) within each phone type's context-independent HMM.

In the specific embodiment, the output distribution of each state of within each phone type q's HMM is a weighted mixture of Gaussian distributions. Good results have been achieved using approximately 100 Gaussian distributions with diagonal covariances (i.e., off-diagonal entries constrained to zero in the covariance matrix).

Parameter values within the Gaussian distributions are established, using standard estimation techniques, from training speech data collected from exemplary speakers.

A first alternate acoustic-scoring embodiment computes a context-dependent posterior probability according to a variation of Equation (9). In this embodiment, Equation (9) is replaced by an approximated equation:

$$P(q_i \mid y_{i'} ctx_i) \approx \frac{p(y_t \mid q_{i'} ctx_i) P(q_i)}{\sum_{All\, q} p(y_t \mid q) P(q)} \quad (12)$$

wherein ctxi represents phone i's context class, i.e., the phone types of phone i's immediately preceding and following phones, as determined by the segmenter HMM 203.

Equation (12) differs from Equation (9) in that the term p(yt|qi,ctxi) in the numerator is computed from an output distribution of an HMM state to which the frame yt is aligned in a context-dependent (i.e., tri-phone) HMM phone model. This term is the output, or "emission" probability of frame yt given phone type qi in the context ctxi. The denominator still uses the sum over the context-independent phones as in the specific embodiment.

The posterior score ρi is replaced (approximated) by a context dependent score ρ'i which is defined as the average of the logarithm of the frame-based phone context-dependent posterior probability over all the frames of the segment:

$$\rho_i \approx \rho'_i = \frac{1}{d_i} \sum_{t=t_i}^{t_i+d_i-1} \log P(q_i \mid y_{i'} ctx_i) \quad (13)$$

wherein di is the duration in frames of the phone i.

The computation may be further simplified; expanding Equation (13) using Equation (12) produces:

$$\rho'_i = \frac{1}{d_i} \sum_{t=t_i}^{t_i+d_i-1} \log[p(y_t \mid q_{i'} ctx_i) P(q_i)] - \frac{1}{d_i} \sum_{t=t_i}^{t_i+d_i-1} \log\left[\sum_{All\, q} p(y_t \mid q) P(q)\right] \quad (14)$$

The first term in Equation (14) can be approximated by the log probability per frame along the maximum likelihood path 313 obtained from the HMM recognizer 203 used for segmentation:

$$\rho_i \approx \rho'_i \approx \log\_prob\_per\_frame_i - \frac{1}{d_i} \sum_{t=t_i}^{t_i+d_i-1} \log\left[\sum_{All\, q} p(y_t \mid q) P(q)\right] \quad (15)$$

The context-dependent model used to compute the numerator of Equation (12) is a more precise model than the context-independent one as it captures the realization of the given phone type in the specific phonetic context of the surrounding phones as they occur in the test sentence. Furthermore, the context-dependent score can be faster to compute than the context-independent score, especially if the approximate methods of computation are used. This is true because the many of the context-dependent score's components already exist from operation of the HMM recognizer 203 used for segmentation.

The score for a phone and a sentence are computed similarly as in the specific embodiment, except that in Equation (10), the context-dependent posterior produced by Equation (12) should be substituted for the context-independent posterior produced by Equation (9).

A second alternate acoustic-scoring embodiment is similar to the specific embodiment but the acoustic scorer 503 computes the denominator of Equation (9) by summing over only a subset of the context-independent phones, this reduces computation and allows a similar normalization effect on the acoustic scores, with little reduction in the usefulness of the acoustic score. The phones used are selected to cover most of the acoustic space (i.e., very dissimilar sounds are chosen).

In a third alternate acoustic-scoring embodiment, the acoustic scorer 503 generates the frame-based posterior probabilities p(qi|yt) directly by using a multi-layer perceptron (MLP). The multi-layer perceptron is trained using forced (i.e., known-script-constrained) alignments on exemplary training data. The training procedure is a standard backpropagation supervised training scheme.

During training, a current frame—and optionally its surrounding acoustic context frames—is presented to the inputs of the MLP along with the desired output. The desired output for any frame is 1-of-N targets (target 1 is set to the output corresponding to the correct phone type and targets 0 are used for the other outputs). Using a relative entropy or minimum square error training criterion, the outputs are known to converge to the frame-based posterior probabilities p(qi|yt).

MLP's are well known in the art, and are described for example in Nelson Morgan and Herve Bourlard, "Continuous Speech Recognition: An introduction to the Hybrid HMM-Connectionist Approach," IEEE Signal Processing Magazine, Vol. 12, No. 3, May '95, pp. 25–42, which is herein incorporated by reference.

The score for a phone and a sentence are computed similarly as in the specific embodiment, except that in Equation (10), the MLP-based posterior is used instead of the HMM-derived posterior.

In a fourth alternate acoustic-scoring embodiment, the acoustic scorer 503 also generates an acoustic-posterior-probability-based score. However, rather than generating frame-based posterior probabilities according to Equation (9), the acoustic scorer 503 generates phone-based posterior probabilities directly. In this embodiment, the acoustic scorer 503 includes an HMM engine. The acoustic scorer 503 operates the HMM engine to generate an alignment for the frames Yi of the student speech sample corresponding to a phone i with every phone type q's hidden Markov phone model using the Viterbi algorithm. The acoustic scorer 503 computes an acoustic log-likelihood, log p(Yi|q), of the speech Yi for each alignment to a phone type q's HMM using the standard HMM backtracing technique known in the art of speech recognition. Using these log-likelihoods, the acoustic scorer 503 computes a posterior log-probability score for a phone i according to:

$$p_i = \log p(q_i | Y_i) = \log \frac{p(Y_i | q_i) P(q_i)}{\sum_{All\, q} p(Y_i | q) Pq} \quad (16)$$

The acoustic scorer 503 computes the acoustic score 115 ρ for an entire utterance as the average of the phone posterior score pi of each phone i in the utterance, according to Equation (11).

IV.B. PHONE LOG-LIKELIHOOD SCORES

In an alternate acoustic-scoring embodiment, the acoustic scorer 503 uses HMM log-likelihoods to derive a likelihood-based pronunciation score 115 L. The underlying assumption is that the logarithm of the likelihood of the speech data, computed by the Viterbi algorithm, using the HMMs obtained from exemplary speakers is a good measure of the similarity (or match) between exemplary speech and the student's speech. The acoustic scorer 503 computes for each phone a normalized log-likelihood l'i:

$$l'_i = l_i | d_i \quad (17)$$

wherein li is the log-likelihood corresponding to phone i and di is its duration in number of frames. The normalization by the phone's duration is to give short-duration phones a boost in their effect on the log likelihood score, which would be dominated by longer phones, otherwise.

The acoustic scorer 503 computes the likelihood-based score 115 L for a whole utterance as the average of the individual normalized log-likelihood scores l'i for each phone i:

$$L = \frac{1}{N} \sum_{i=1}^{N} l'_i \quad (18)$$

wherein the sum runs over the number N of phones in the utterance.

V. COMBINATION OF SCORES AND MAPPING TO A HUMAN GRADE

Figure 6:
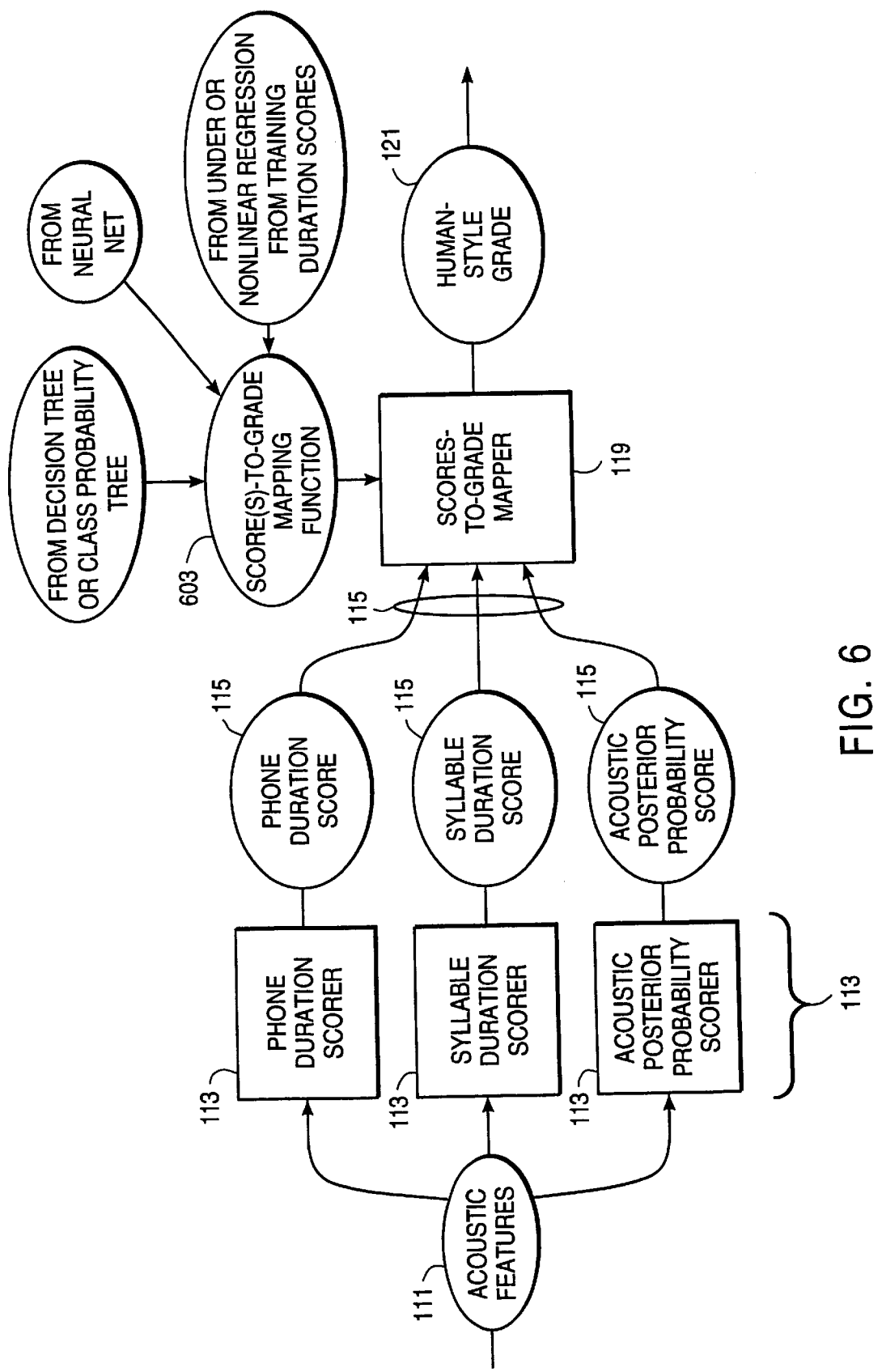
FIG. 6 is a block diagram of a system that combines different pronunciation scores according to an embodiment of the invention.

FIG. 6 is a block diagram of a system that combines different types of pronunciation scores according to an embodiment of the invention. By combining scores, an improvement in evaluation performance is achieved, overall, as compared to using each score by itself.

In FIG. 6, multiple pronunciation scores 115 are computed for acoustic features 111 of a single utterance. These scores include a phone duration score 115, a syllabic duration score, 115, and an acoustic-posterior-probability-based score 115, which have been described, separately. The scores are shown as being generated by three separate scorers 113. In actual implementation, the three separate scorers 113 would likely share many common components, such as an acoustic segmenter 203 (of FIGS. 2 and 5).

A scores-to-grade mapper 119 accepts the different scores 115 and applies a mapping function 603 to the scores 115 to derive a single grade 121.

Figure 7:
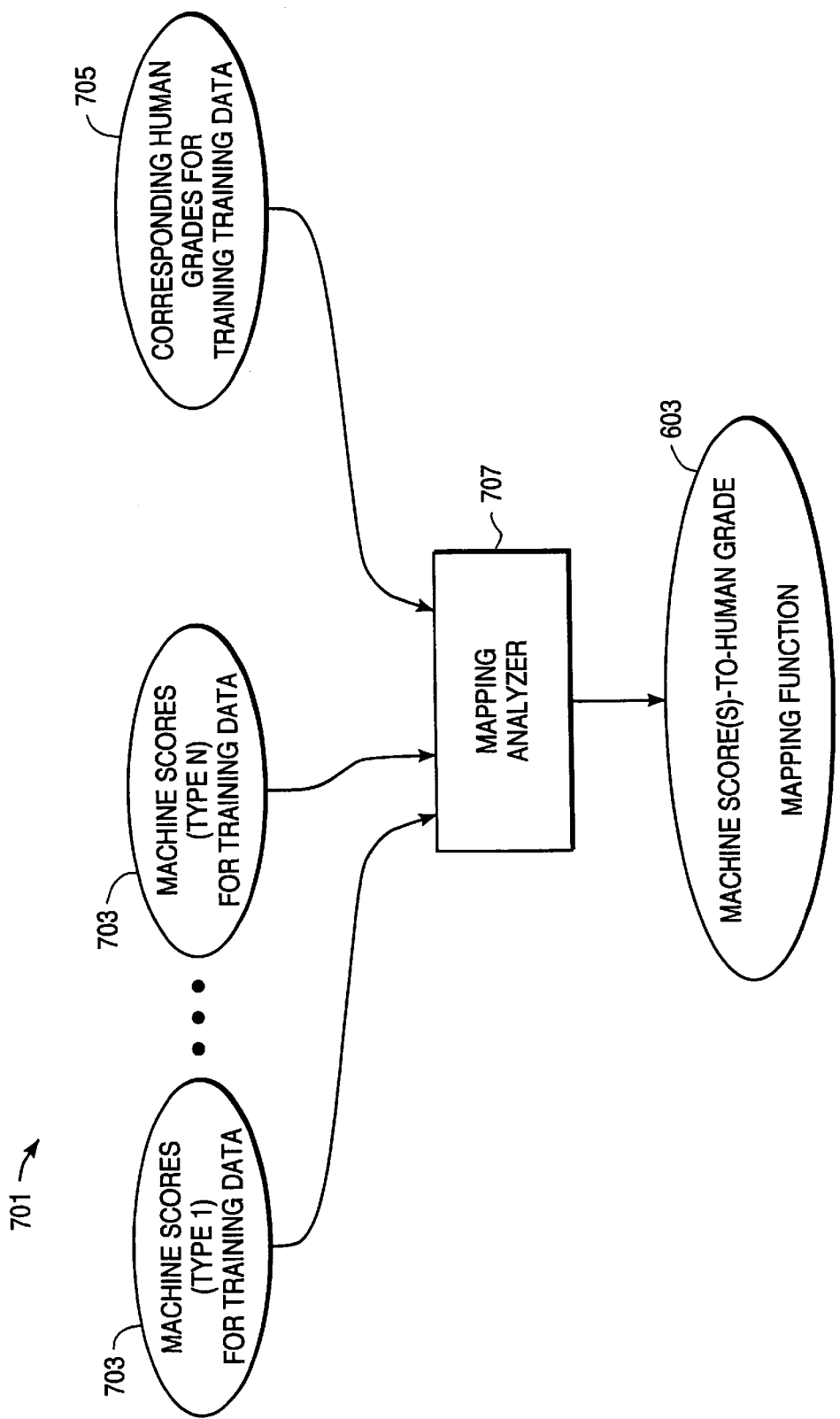
FIG. 7 is a block diagram of a system for creating FIG. 6's mapping function between one or more types of machine scores into a pronunciation grade as would be produced by a human grader.

FIG. 7 is a block diagram of a system 701 for creating FIG. 6's mapping function 603 between one or more types of machine scores into a pronunciation grade as would be produced by a human listener. In FIG. 7, machine scores 703 are generated for utterances in a development set of training speech data. Human-generated scores 705 are also collected for the utterances in the development set. The development set is assembled so as to include speech from speakers of varying proficiency levels.

A mapping analyzer 707 processes the machine scores 703 and the corresponding human grades 705 to generate a scores-to-grade mapping 603.

In one embodiment of the invention, the mapping analyzer 707 uses linear regression to linearly combine two or more machine scores (m1, ..., mn) for each utterance, plus a bias term, to approximate the corresponding human score h:

$$h' = \lambda_0 + \lambda_1 m_1 + \ldots + \lambda_n m_n \quad (19)$$

The linear coefficients λj and bias term λ0 are optimized to minimize the mean square between the predicted and the actual human scores over the utterances of the development set.

In another embodiment of the invention, the mapping analyzer 707 uses nonlinear regression. The machine scores 703 to be combined are the input to a neural network 603 that implements the mapping between the multiple machine scores 703 and the corresponding human scores 705. The mapping analyzer establishes the parameters within the neural network 603 using the actual human scores 705 as targets. The network has a single linear output unit and 16 sigmoidal hidden units. The mapping analyzer trains the neural network using the standard backpropagation technique, using cross-validation on about 15 percent of the training data. The training is stopped when performance degrades on the cross-validation set.

In another embodiment of the present invention, the mapping analyzer 707 computes a mapping 603 that defines the predicted human score h' as the conditional expected value of the actual human score h given the measured machine scores m1, ..., mn:

$$h' = E[h | m_1, \ldots, m_n] \quad (20)$$

To compute the expectation the conditional probability P(h|M1, ..., Mn) is needed. The mapping analyzer 707 computes this conditional probability as:

$$P(h | m_1, \ldots, m_n) = \frac{p(m_1, \ldots, m_n | h) P(h)}{\sum_{j=1}^{G} p(m_1, \ldots, m_n | h_j) P(h_j)} \quad (21)$$

wherein the sum in the denominator is over all G possible grades and P(h) is the prior probability of the grade h and the conditional distribution is modeled approximately by a discrete distribution based on scalar or vector quantization of the machine scores. The number of bins to use in the quantization is determined by the amount of available training data. The more available data, the more bins may be used.

In yet another embodiment of the invention, the mapping analyzer 707 uses a decision tree or, alternatively, a class probability tree.

The machine scores to be combined are the input to a tree that implements the mapping between the machine scores 703 and the corresponding human scores 705. The mapping analyzer establishes the parameters within the decision tree (or alternative the class probability tree) using the actual human scores 705 as target classes according to algorithms, known in the art, for constructing decision trees. A discrete set of human targets are defined as classes used by the decision or class probability tree into which classify the input machine scores.

VI. LANGUAGE INSTRUCTION IN A CLIENT-SERVER ENVIRONMENT

Figure 8:
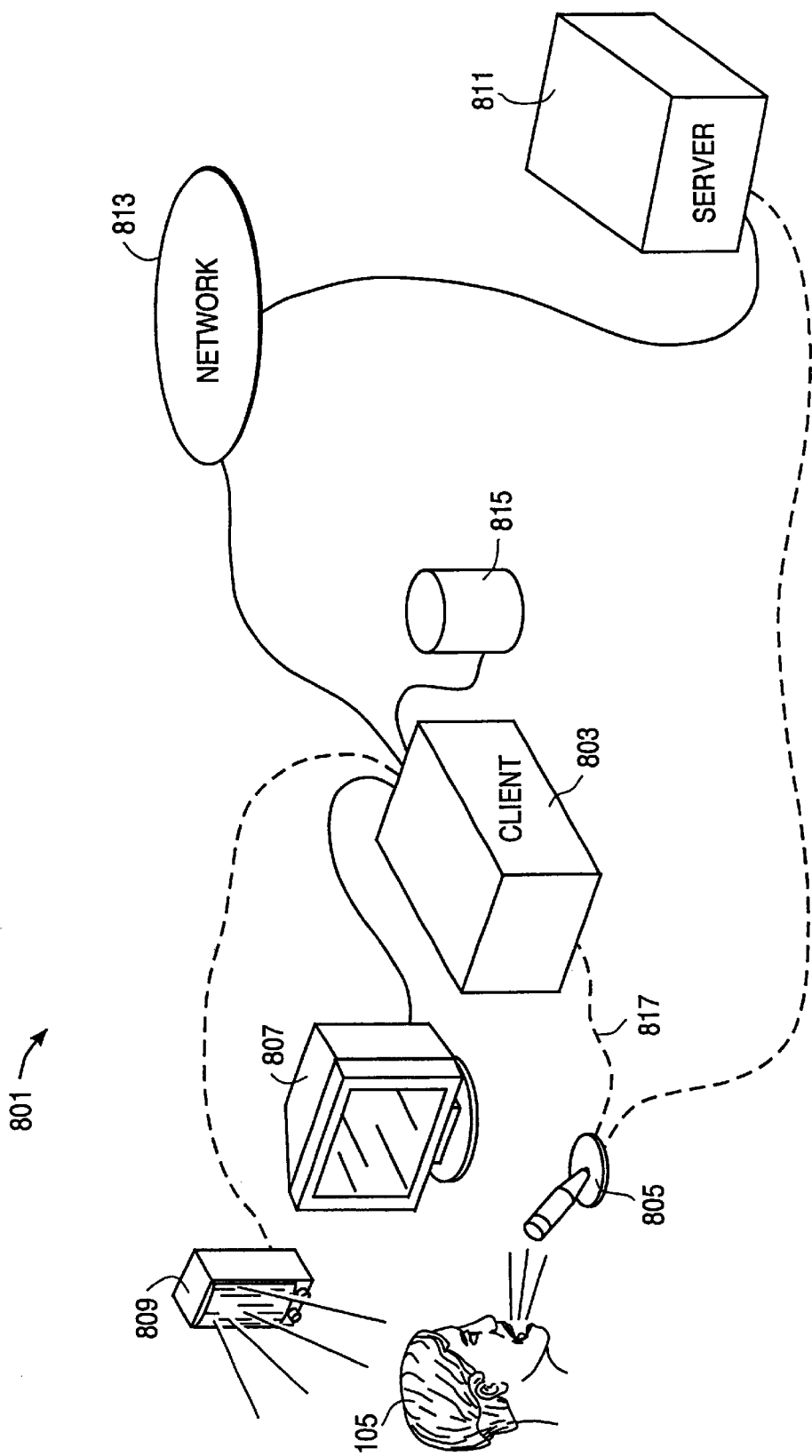
FIG. 8 is a block diagram of a distributed language instruction system that evaluates pronunciation quality.

FIG. 8 is a block diagram of a distributed system 801 for language instruction that evaluates pronunciation quality. In FIG. 8, a remote client processor 803 runs a client process. The client process executes software instructions that presents a prompt to a student 105. In response, the student 105 speaks into a microphone 805. As will be further discussed, the system 801 contains a pronunciation evaluator (101, as shown in FIG. 1 only). The microphone 805 forms at least a part of the pronunciation evaluator's speech input device (103, as shown in FIG. 1 only).

In one embodiment of FIG. 8, the client process uses a computer display 807 to provide the prompts. One type of prompt is a displayed script to be read by the student 105. The client process exceeds previous pronunciation evaluation systems in that it can (and does) use scripts containing words for which there may be no training data or incomplete training data, as described above. These scripts include scripts generated dynamically during execution by the system 801. Another novel way by which the client process can (and does) elicit the verbal utterances is to ask open-ended questions to which the student 105 answers spontaneously, without reading from any script, as described above. Thus, the system 801 according to the present invention permits a virtually inexhaustible, immediately-usable supply of unique word sequences for pronunciation evaluation.

In another embodiment, the display 807 is replaced or supplemented by a peaker 809 that provides audio prompts, such as scripts and questions.

A local server processor 811 runs a server process that controls the language instruction lesson being executed on the client processor 803 via a network 813, such as a local area network, the Internet, etc. In one embodiment, the server process controls the lesson by dynamically sending control information that contains or specifies individual prompts, such as scripts and questions, shortly before the prompts are to be provided to the student 105. In another embodiment, the server process controls the lesson more loosely by downloading control information which includes software (e.g., JAVA-language software) for individual lessons to the client processor 803's local storage 815, which includes RAM, or hard disk, etc. The client processor 803 thereafter runs the lesson software with less direct supervision from the server processor 811.

In some embodiments of the invention, the server processor 811 contains the final stages of the pronunciation evaluator which generate the evaluation grade for student pronunciation. In one such embodiment, the microphone 805 is coupled 817 to convey speech to the client processor 803. The client process relays student speech samples across the network 813 to an audio receiver process operating in conjunction with the server process to request pronunciation evaluation. The audio receiver process runs on the server processor 811.

In other such embodiments, the microphone 805 is coupled to relay student speech samples to the server process across a separate channel 819 which is not under the direct control of the client process. The separate channel 819 in one of these embodiments is a physically separate channel, such as a telephone channel. The separate channel 819 in another of these embodiments is a virtual channel that appears to the server process to be a separate channel, even though it is implemented using physical lines also shared by the client-to-server connection. For example, the virtual channel may be implemented using the audio virtual channel of a Digital Simultaneous Voice and Data (DSVD) modem, whose data virtual channel handles the client-to-server communications.

In other embodiments, the pronunciation evaluator (of FIG. 1) is not implemented on the server processor 811. Instead, the evaluator is implemented on either the client processor 803 or elsewhere. Therefore, pronunciation evaluation is controlled by the client process without need for sending speech samples to the server process. In these embodiments, the server processor 81 1's computation resources are conserved because it needs only control the lesson. In this way, the server processor 811 becomes capable of controlling a greater number of lessons simultaneously in a multi-tasking manner.

As described, the client process and the server process run on separate processors 803 and 811 which are coupled via a network 813. In general, though, the client process and the server process may run on a single processor in a multi-tasking manner.

The invention has now been explained with reference to specific embodiments. Other embodiments will be apparent to those of ordinary skill in the art in view of the foregoing description. For example, preselected scripts may be delivered to a user via off-line means such as a written guidebook, as a newspaper advertisement or in other visual or auditory forms. It is therefore not intended that this invention be limited, except as indicated by the appended claims.

What is claimed is:

1. In an automatic speech processing system, a method for grading the pronunciation of a student speech sample, the method comprising:

accepting said student speech sample which comprises a sequence of words spoken by a student speaker;

operating a set of trained speech models to compute at least one posterior probability from said speech sample, each of said posterior probabilities being a normalized probability, with respect to a set of models including competing models and the model corresponding to the speech sample, that a particular portion of said student speech sample corresponds to a particular known model given said particular portion of said speech sample; and computing an evaluation score, herein referred to as the posterior-based evaluation score, of pronunciation quality for said student speech sample from said posterior probabilities.

2. The method according to claim 1 wherein each of said posterior probabilities is derived from a model likelihood by dividing the likelihood that said particular known model generated said particular portion of said student speech sample by the maximum one of the likelihoods that individual alternative models had generated said particular portion of said speech sample.

3. The method according to claim 2 wherein:

said particular known model is a context-dependent model; and individual models are context-dependent or context-independent models.

4. The method according to claim 2 further comprising:
mapping said posterior-based evaluation score to a grade as would be assigned by human listener; and
presenting said grade to said student speaker.

5. The method according to claim 2 wherein said student speech sample comprises an acoustic features sequence, the method further comprising the steps of:
computing a path through a set of trained hidden Markov models (HMMs) from among said trained speech models, said path being an allowable path through the HMMs that has maximum likelihood of generating said acoustic features sequence; and
identifying transitions between phones within said path, thereby defining phones.

6. The method according to claim 5 wherein the path computing step is performed using the Viterbi search technique.

7. The method according to claim 5 wherein said spoken sequence of words is unknown, and the path computing step is performed using a computerized speech recognition system that determines said spoken sequence of words.

8. A system for assessing pronunciation of a student speech sample, said student speech sample comprising a sequence of words spoken by a student speaker, the system comprising:
trained speech acoustic models of exemplary speech; and
an acoustic scorer configured to compute at least one posterior probability from said speech sample using said trained speech models, said acoustic scorer also configured to compute an evaluation score of pronunciation quality for said student sample from said posterior probabilities, each of said posterior probabilities being a normalized probability, with respect to a set of models including competing models and the model correspondinig to the speech sample, that a particular portion of said student speech sample corresponds to a particular known model given said particular portion of said speech sample.

9. A system for pronunciation training in a client/server environment wherein there exists a client process for presenting prompts to a student and for accepting student speech elicited by said prompts, the system comprising:
a server process for sending control information to said client process to specify a prompt to be presented to said student and for receiving a speech sample derived from said student speech elicited by said presented prompt; and
a pronunciation evaluator invocable by said server process for analyzing said student speech sample, wherein:
said pronunciation evaluator is established, using an acoustic model for computing a posterior probability-based evaluation score, of pronunciation quality for said student speech sample.

10. The system according to claim 9 wherein said server process receives said speech sample over a speech channel that is separate from a communication channel through which said server process and said client process communicate.

11. The system according to claim 9 wherein said client process and said server process are located on two separate computer processors and communicate via a network.

* * * * *